United States Patent
Agarwal et al.

(10) Patent No.: US 11,088,943 B2
(45) Date of Patent: Aug. 10, 2021

(54) DIFFSERV TRAFFIC ENGINEERING COMPLIANT BACKUP PATHS FOR FAST REROUTE PROTECTION IN MPLS

(71) Applicant: Ciena Corporation, Hanover, MD (US)

(72) Inventors: Gaurav Agarwal, New Delhi (IN); Jayant Kumar Bhardwaj, New Delhi (IN); Manoj Rautela, Pithoragarh (IN)

(73) Assignee: Ciena Corporation, Hanover, MD (US)

( * ) Notice: Subject to any disclaimer, the term of this patent is extended or adjusted under 35 U.S.C. 154(b) by 358 days.

(21) Appl. No.: 16/245,331

(22) Filed: Jan. 11, 2019

(65) Prior Publication Data
US 2020/0177500 A1   Jun. 4, 2020

(30) Foreign Application Priority Data
Nov. 29, 2018   (IN) .............................. 201811045150

(51) Int. Cl.
| | |
|---|---|
| *H04L 12/28* | (2006.01) |
| *H04L 12/703* | (2013.01) |
| *H04L 12/911* | (2013.01) |
| *H04L 12/723* | (2013.01) |
| *H04L 12/707* | (2013.01) |
| *H04L 12/715* | (2013.01) |

(Continued)

(52) U.S. Cl.
CPC .............. *H04L 45/28* (2013.01); *H04L 45/22* (2013.01); *H04L 45/50* (2013.01); *H04L 45/64* (2013.01); *H04L 47/724* (2013.01); *H04L 47/821* (2013.01); *H04L 47/825* (2013.01); *H04L 12/4633* (2013.01)

(58) Field of Classification Search
CPC ......... H04L 69/40; H04L 45/00; H04L 45/22; H04L 45/28; H04L 45/502; H04L 47/15; H04L 47/70; H04L 47/724; H04L 47/728
See application file for complete search history.

(56) References Cited

U.S. PATENT DOCUMENTS

2015/0188803 A1*   7/2015   Li .......................... H04L 45/22
                                                                    370/235

FOREIGN PATENT DOCUMENTS

CN          103166848 A   *   1/2013    ............. H04L 12/46

OTHER PUBLICATIONS

E. Rosen et al., MPLS Label Stack Encoding, Network Working Group, Standards Track, The Internet Society, Jan. 2001, pp. 1-23.
(Continued)

*Primary Examiner* — Abdelillah Elmejjarmi
(74) *Attorney, Agent, or Firm* — Clements Bernard Walker; Lawrence A. Baratta, Jr.; Christopher L. Bernard

(57) ABSTRACT

Systems and methods, in a Label Edge Router (LER) which includes one or more ports and a switching fabric therebetween, include, responsive to a request for a Label Switched Path (LSP) tunnel with a specified DiffServ Traffic Engineering (DSTE) Class Type, signaling a PATH message via a port for the LSP tunnel in a Multiprotocol Label Switching (MPLS) network; incorporating a FAST_REROUTE object in the PATH message which indicates Facility Bypass is desired; and incorporating the DSTE Class Type in the FAST_REROUTE object of the PATH message for a Point of Local Repair (PLR) node in the MPLS network to ensure a Facility Bypass tunnel used for the LSP tunnel supports the specified DSTE Class Type.

15 Claims, 7 Drawing Sheets

(51) Int. Cl.
*H04L 12/913* (2013.01)
*H04L 12/46* (2006.01)

(56) References Cited

OTHER PUBLICATIONS

D. Awduche et al., RSVP-TE: Extensions to RSVP for LSP Tunnels, Network Working Group, Standards Track, The Internet Society, Dec. 2001, pp. 1-61.
P. Pan et al., Fast Reroute Extensions to RSVP-TE for LSP Tunnels, Network Working Group, Standards Track, The Internet Society, May 2005, pp. 1-38.
F. Le Faucheur, Protocol Extensions for Support of Diffserv-aware MPLS Traffic Engineering, Network Working Group, Standards Track, The Internet Society, Jun. 2005, pp. 1-37.

* cited by examiner

```
CLASS-NUM = 205
    C-TYPE = 1
```

| 1 | 2 | 3 | 4 |
|---|---|---|---|
| LENGTH (BYTES) || CLASS-NUM | C-TYPE |
| SETUP PRIOR | HOLD PRIOR | HOP LIMIT | FLAGS |
| BANDWIDTH ||||
| INCLUDE-ANY ||||
| EXCLUDE-ANY ||||
| INCLUDE ALL ||||

```
Flags

0x01   One-to-One Backup Desired
         Requests protection via the one-to-one backup method.

0x02   Facility Backup Desired
         Requests protection via the facility backup method.

b7  b6  b5  b4  b3  b2  b1  b0
0   0   0   x   x   x   x   x  : DSTE CLASS -0
0   0   1   x   x   x   x   x  : DSTE CLASS -1
0   1   0   x   x   x   x   x  : DSTE CLASS -2
0   1   1   x   x   x   x   x  : DSTE CLASS -3
1   0   0   x   x   x   x   x  : DSTE CLASS -4
1   0   1   x   x   x   x   x  : DSTE CLASS -5
1   1   0   x   x   x   x   x  : DSTE CLASS -6
1   1   1   x   x   x   x   x  : DSTE CLASS -7
```

*FIG. 5*

DIFFSERV TRAFFIC ENGINEERING COMPLIANT BACKUP PATHS FOR FAST REROUTE PROTECTION IN MPLS

FIELD OF THE DISCLOSURE

The present disclosure generally relates to networking, namely Multiprotocol Label Switching (MPLS). More particularly, the present disclosure relates to systems and methods for DiffServ Traffic Engineering (DSTE) compliant backup paths for Fast Reroute protection in MPLS.

BACKGROUND OF THE DISCLOSURE

Multiprotocol Label Switching (MPLS) is a mechanism applied in networks that directs data from one network node or network element to the next based on locally significant short path labels rather than long, globally significant, network addresses, thereby avoiding complex lookups in a routing table. For example, MPLS is described, in part, in Request for Comments (RFC) 3032 "MPLS Label Stack Encoding," January 2001, the contents of which are incorporated by reference herein. Fast Reroute (FRR) is an MPLS resiliency technique providing fast traffic recovery upon link or router failures for critical services. Upon any single link or node failures, the technique would be able to recover impacted traffic flows at the level of 50 ms. FRR is described in RFC 4090 "Fast Reroute Extensions to RSVP-TE for LSP Tunnels," May 2005, the contents of which are incorporated by reference herein. Resource Reservation Protocol-Traffic Engineering (RSVP-TE) extensions are defined in RFC 3209 "Extensions to RSVP for LSP Tunnels," December 2001, the contents of which are incorporated by reference herein.

RFC 3209 describes the use of RSVP, including all the necessary extensions, to establish Label Switched Path (LSP) in MPLS. Since the flow along an LSP is completely identified by the label applied at the ingress node of the path, these paths may be treated as tunnels. An application of LSP tunnels is traffic engineering with MPLS as specified in RFC 2702, "Requirements for Traffic Engineering Over MPLS," September 1999, the contents of which are incorporated by reference herein.

RFC 4090 defines RSVP-TE extensions to establish backup LSP tunnels for local repair of LSP tunnels. These mechanisms enable the re-direction of traffic onto backup LSP tunnels in 10s of milliseconds, in the event of a failure. Two approaches are defined, a one-to-one backup approach creates detour LSPs for each protected LSP at each potential point of local repair and a Facility Backup (FB) approach creates a bypass tunnel to protect a potential failure point. By taking advantage of MPLS label stacking, the bypass tunnel approach can protect a set of LSPs that have similar backup constraints. In the FB approach, local protection is provided on a Point of Local Repair (PLR) by creating a backup path over another tunnel which originates on the PLR and terminates on a Merge Point (MP), bypassing the protected router.

DiffServ Traffic Engineering (DSTE) is described in RFC 4124 "Protocol Extensions for Support of Diffserv-aware MPLS Traffic Engineering, June 2005, the contents of which are incorporated by reference herein. DiffServ stands for Differentiated Service and is the ability to enforce different bandwidth constraints for different classes of traffic. That is, DiffServ allows a network operator to define different MPLS tunnels for various types of services offered in the network.

Disadvantageously, there is no conventional technique in RFC 4090, RSVP, or FRR to select an FB with a specified class type in DiffServ.

BRIEF SUMMARY OF THE DISCLOSURE

In an embodiment, a method includes, in a Label Edge Router (LER) which includes one or more ports and a switching fabric therebetween, responsive to a request for a Label Switched Path (LSP) tunnel with a specified DiffServ Traffic Engineering (DSTE) Class Type, signaling a PATH message via a port for the LSP tunnel in a Multiprotocol Label Switching (MPLS) network; incorporating a FAST_REROUTE object in the PATH message which indicates that Facility Bypass is desired; and incorporating the specified DSTE Class Type in the PATH message for a Point of Local Repair (PLR) node in the MPLS network to ensure that a Facility Bypass tunnel used for the LSP tunnel supports the specified DSTE Class Type. The DSTE Class Type can be incorporated in the FAST_REROUTE object. The DSTE Class Type can be incorporated in flags in the FAST_REROUTE object. The DSTE Class Type can be incorporated in unspecified flags in the FAST_REROUTE object.

At the PLR node, the PATH message can be received with a FAST_REROUTE object including the DSTE Class Type therein, and, responsive to a failure of the LSP tunnel, the PLR node can be configured to select the Facility Bypass tunnel for the LSP tunnel such that the Facility Bypass tunnel supports the specified DSTE Class Type. The method can further include, at the PLR node, receiving a second PATH message for a second LSP tunnel with a second FAST_REROUTE object including a second DSTE Class Type that is the same as the specified DSTE Class Type; and, responsive to a failure of the second LSP tunnel, selecting the Facility Bypass tunnel for both the LSP tunnel and the second LSP tunnel.

The method can further include, at the PLR node, receiving a second PATH message for a second LSP tunnel with a second FAST_REROUTE object including a second DSTE Class Type for a different DSTE Class Type than the specified DSTE Class Type; and, responsive to a failure of the second LSP tunnel, selecting a second Facility Bypass tunnel for the second LSP tunnel such that the second Facility Bypass tunnel supports the different specified DSTE Class Type. The method can further include, at the PLR node, receiving the PATH message with the DSTE Class Type included therein, wherein the PLR node is not configured to process the DSTE Class Type in the FAST_REROUTE object of the PATH message; and, responsive to a failure of the LSP tunnel, selecting the Facility Bypass tunnel for the LSP tunnel irrespective of the specified DSTE Class Type.

In another embodiment, a Label Edge Router (LER) network element includes one or more ports; forwarding circuitry communicatively coupled to the one or more ports; and control circuitry communicatively coupled to the forwarding circuitry, wherein the control circuitry is configured to, responsive to a request for a Label Switched Path (LSP) tunnel to the control circuitry with a specified DiffServ Traffic Engineering (DSTE) Class Type, cause a PATH message to be signaled via a port for the LSP tunnel in a Multiprotocol Label Switching (MPLS) network, cause incorporation of a FAST_REROUTE object in the PATH message that indicates Facility Bypass is desired, and cause incorporation of the DSTE Class Type in the PATH message for a Point of Local Repair (PLR) node in the MPLS network to ensure a Facility Bypass tunnel used for the LSP tunnel supports the specified DSTE Class Type. The DSTE Class Type can be incorporated in the FAST_REROUTE object. The DSTE Class Type can be incorporated in flags in the FAST_REROUTE object. The DSTE Class Type can be incorporated in unspecified flags in the FAST_REROUTE object.

In a further embodiment, a Point of Local Repair (PLR) network element includes one or more ports; forwarding circuitry communicatively coupled to the one or more ports; and control circuitry communicatively coupled to the forwarding circuitry, wherein the control circuitry is configured to, responsive to reception of a PATH message via a port for a Label Switched Path (LSP) tunnel in a Multiprotocol Label Switching (MPLS) network with a specified DiffServ Traffic Engineering (DSTE) Class Type, process a FAST_REROUTE object in the PATH message which indicates Facility Bypass is desired, determine the DSTE Class Type based on the PATH message for a Point of Local Repair (PLR) node, and store the DSTE Class Type for the LSP tunnel to ensure a Facility Bypass tunnel used for the LSP tunnel supports the specified DSTE Class Type. The DSTE Class Type can be incorporated in the FAST_REROUTE object. The DSTE Class Type can be incorporated in flags in the FAST_REROUTE object. The DSTE Class Type can be incorporated in unspecified flags in the FAST_REROUTE object.

The control circuitry can be further configured to, responsive to a failure of the LSP tunnel, select the Facility Bypass tunnel for the LSP tunnel such that the Facility Bypass tunnel supports the specified DSTE Class Type. The control circuitry can be further configured to receive a second PATH message for a second LSP tunnel with a second FAST_REROUTE object including a second DSTE Class Type that is the same as the specified DSTE Class Type; and, responsive to a failure of the second LSP tunnel, select the Facility Bypass tunnel for both the LSP tunnel and the second LSP tunnel. The control circuitry can be further configured to receive a second PATH message for a second LSP tunnel with a second FAST_REROUTE object including a second DSTE Class Type therein for a different DSTE Class Type than the specified DSTE Class Type; and, responsive to a failure of the second LSP tunnel, select a second Facility Bypass tunnel for the second LSP tunnel such that the second Facility Bypass tunnel supports the different specified DSTE Class Type. The control circuitry can be further configured to responsive to a failure of the LSP tunnel, select the Facility Bypass tunnel for the LSP tunnel irrespective of the specified DSTE Class Type.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a diagram of a FAST_REROUTE object;

DETAILED DESCRIPTION OF THE DISCLOSURE

The present disclosure relates to systems and methods for DiffServ Traffic Engineering (DSTE) compliant backup paths for Fast Reroute protection in MPLS. The systems and methods allow MPLS routers to select FRR backup paths which are compliant to DSTE to handle a tunnel's traffic as specified by an associated DSTE Class Type. Thus, traffic which is going on a backup path due to a failure is provided to an FB tunnel which has the same DSTE Class Type as the normal (primary) path. Advantageously, the systems and methods do not require new objects or sub-classes in RSVP signaling, thereby not impacting any device which lacks support for this enhancement. The systems and methods ensure DSTE capability even for backup path selection.

MPLS Network

Figure 1:
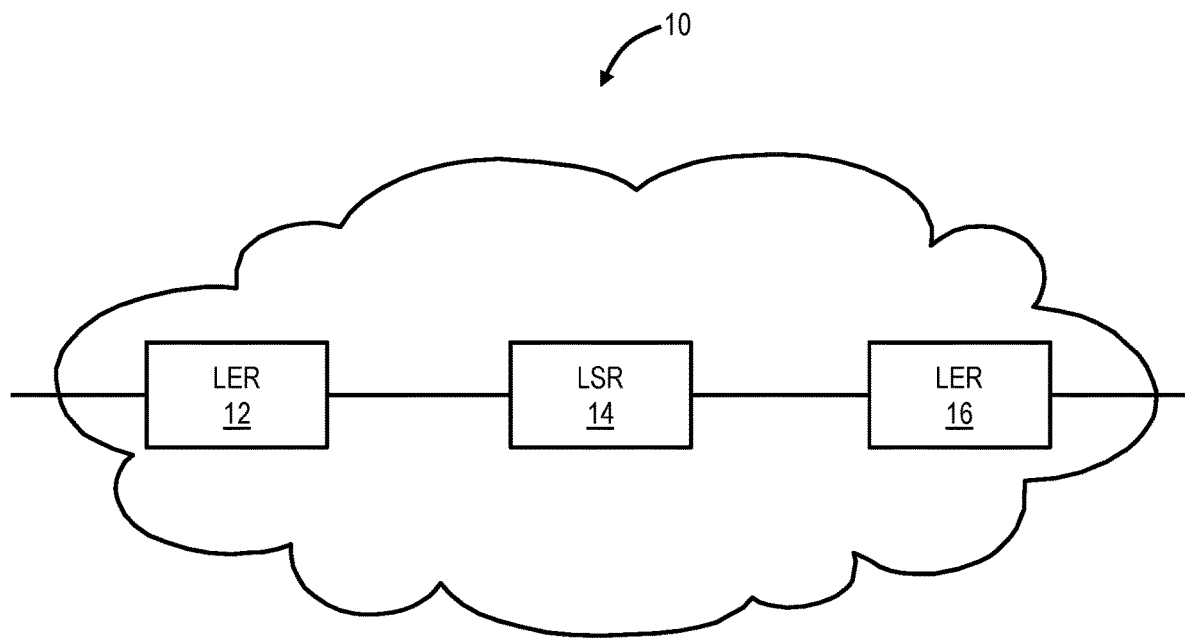
FIG. 1 is a network diagram of an example MPLS network with three network elements contained therein.

FIG. 1 is a network diagram of an example MPLS network 10 with three network elements 12, 14, 16 contained therein. The network elements 12, 16 are Label Edge Routers (LER), and the network element 14 is a Label Switch Router (LSR). The MPLS network 10 is presented herein for illustration purposes, and those of ordinary skill in the art will recognize other deployments can include additional network elements. Within the MPLS network 10, the LSR 14 is configured to forward traffic along Label Switched Paths (LSPs) between the LERs 12, 16. MPLS is used in the MPLS network 10 to reduce the number of lookups performed at the various network elements 12, 14, 16. For example, a packet can be received by the LER 12 which conventionally performs a lookup to determine which label should be pushed onto the packet to switch the packet onto an LSP to the next hop through the MPLS network 10 to reach its destination. When the packet arrives at the LSR 14, the LSR 14 reads the MPLS label and replace the MPLS label with a new MPLS label. MPLS thus allows a single route lookup to be performed at the edge of the MPLS network 10 and allows label switching to be used instead of lookups to forward the packet across the MPLS network 10.

Example Network Element

Figure 2:
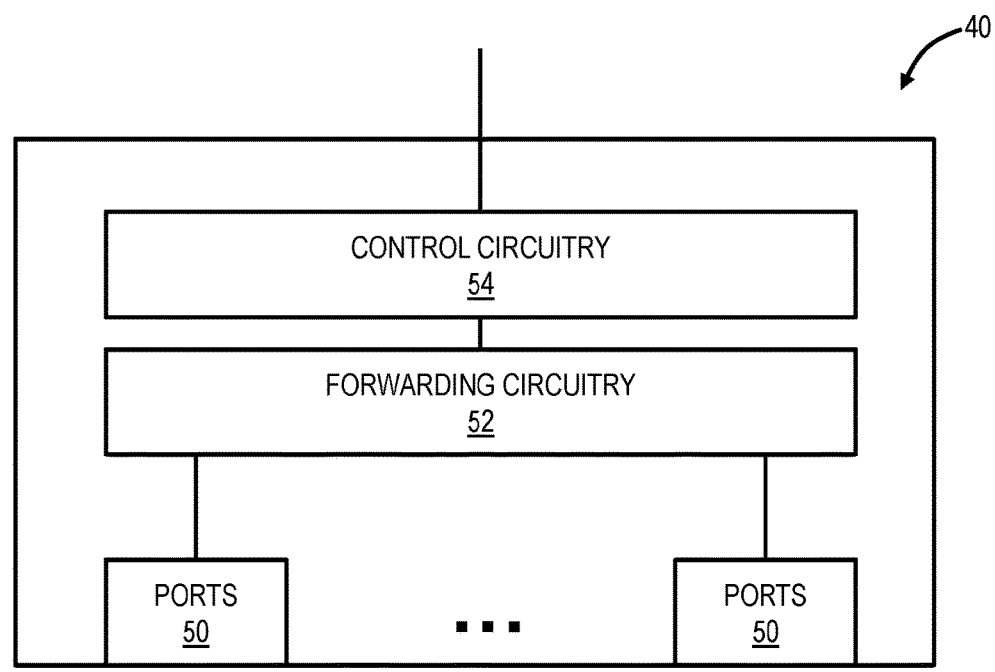
FIG. 2 is a block diagram of an example network element which may be used with the systems and methods.

FIG. 2 is a block diagram of an example network element 40 which may be used with the systems and methods. In this example, the network element 40 is a switch for illustration purposes, but those of ordinary skill in the art will recognize the systems and methods described herein contemplate other types of network elements and other implementations. In this embodiment, the network element 40 includes a plurality of ports 50, forwarding circuitry 52, and control circuitry 54. The network element 40 can be an LER, LSR, etc. The ports 50 provide physical connectivity of the network element 40 to other network elements, switches, routers, etc. The ports 50 are configured to provide ingress and egress of packets such as packets utilizing MPLS. The forwarding circuitry 52 is configured to forward a received packet with one a label associated with another network element. The control circuitry 54 is configured to provide exchange and/or flooding according to various protocols. For example, the control circuitry 54 can perform the Intermediate System to Intermediate System (IS-IS) protocol, Label Distribution Protocol (LDP), RSVP-TE, etc.

The forwarding circuitry 52 can include switching components to form a switching fabric between all of the ports 50 allowing data traffic to be switched between the ports 50. The switching fabric is a combination of hardware, software, firmware, etc. that moves data coming into the network element 40 out by the correct port 50 to the next network element. In general, the switching fabric may include switching units, or individual boxes, in a node; integrated circuits contained in the switching units; and programming that allows switching paths to be controlled. The control circuitry 54 can include a processor, memory, etc. which collectively control, configure, provision, monitor, etc. the network element 40. The control circuitry 54 be utilized to communicate with a management system such as a Network Management System (NMS), Element Management System (EMS), and the like. Additionally, the control circuitry 54 may include a database that tracks and maintains provisioning, configuration, operational data, and the like.

DiffServ Traffic Engineering

Figure 3:
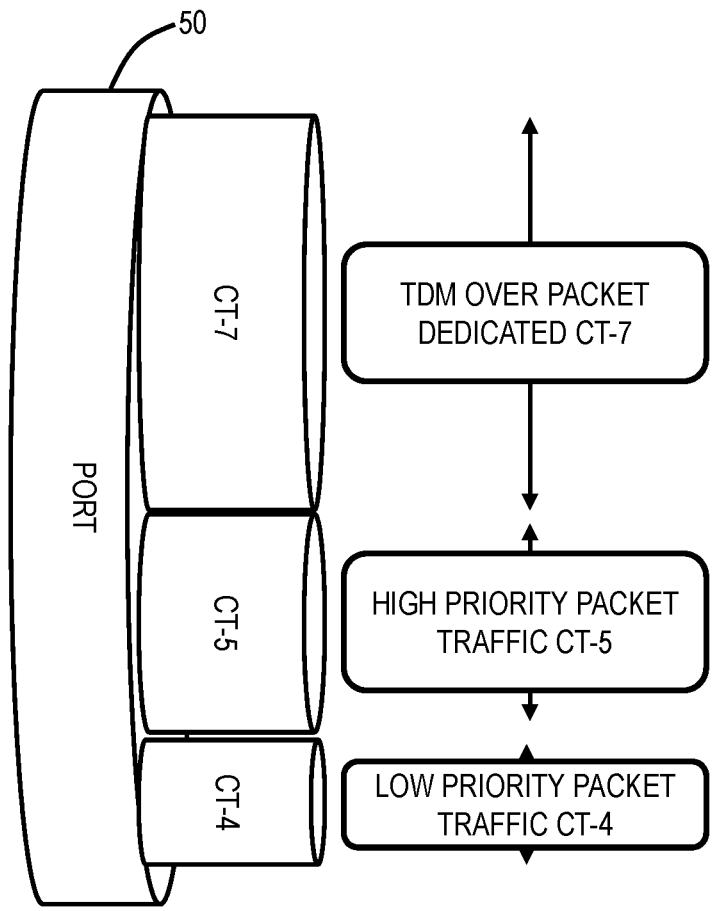
FIG. 3 is a diagram of a port with example DSTE functionality.

FIG. 3 is a diagram of a port 50 with example DSTE functionality. DSTE functionality ensures dedicated and different bandwidth constraints and resources for a different set of DSTE Class Type capable MPLS tunnels. This allows a network operator to define different MPLS tunnels for various type of services offered by the network. FIG. 3 illustrates three example DSTE Class Types including CT-7 for Time Division Multiplexing (TDM) traffic over packet, CT-5 for high priority packet traffic, and CT-4 for low priority packet traffic. Of course, other embodiments are contemplated. The network operator divides the port bandwidth into various DSTE Class Types as in FIG. 3 and MPLS tunnels are defined for each separate class.

Conventional FRR Functionality with DSTE

Figure 4:
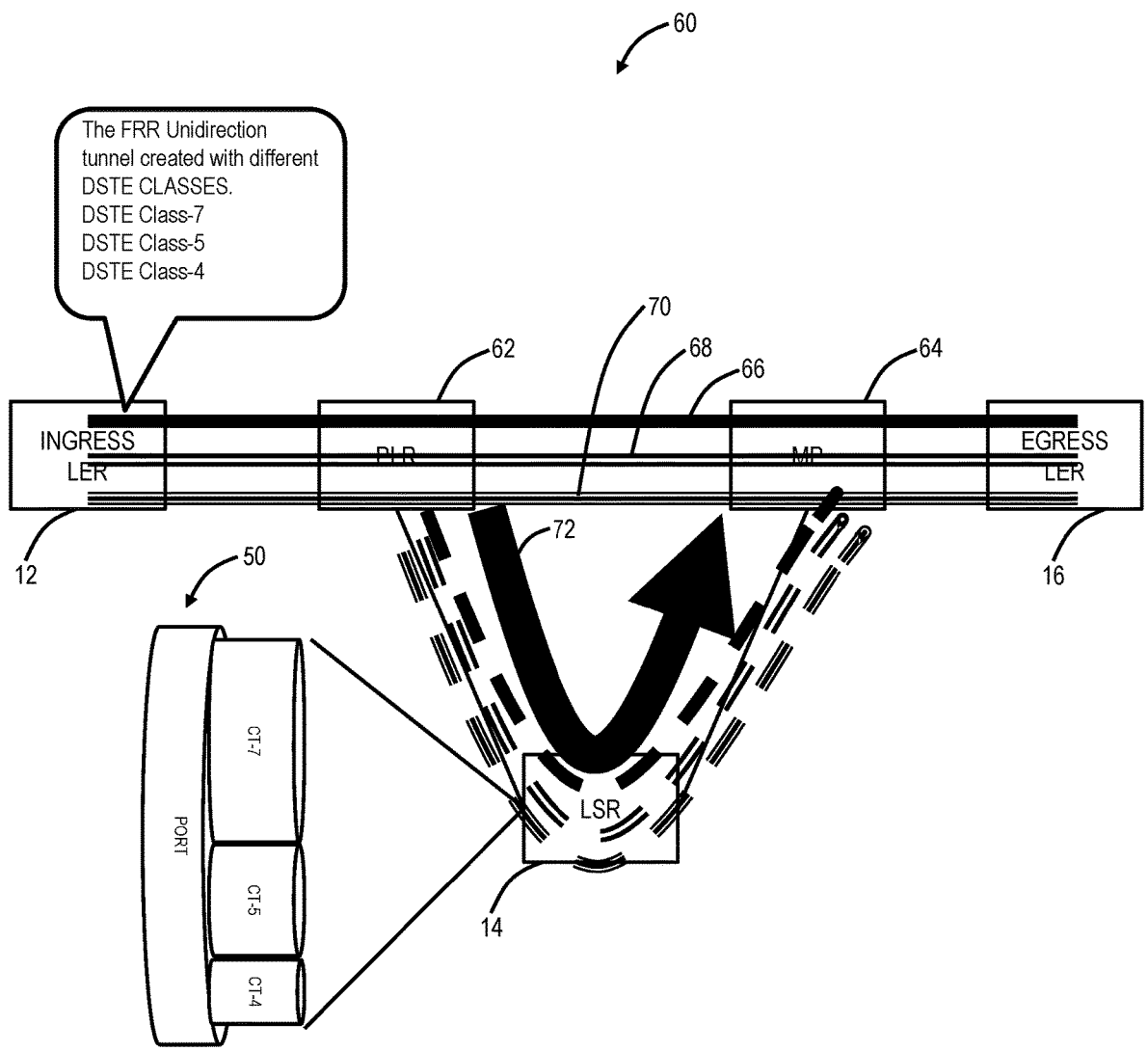
FIG. 4 is a diagram of a network illustrating conventional Fast Reroute (FRR) functionality with DSTE.

FIG. 4 is a diagram of a network 60 illustrating conventional FRR functionality with DSTE. The network 60 is an MPLS network and includes an ingress LER 12 interconnected to an egress LER 16 via an intermediate Point of Local Repair (PLR) node 62 and a Merge Point (MP) node 64. The network 60 includes three DSTE Class Types such as illustrated in FIG. 3, CT-7, CT-5, CT-4 and there are tunnels 66, 68, 70 (tunnels are also referred to as LSPs) for each of the respective DSTE Class Types CT-7, CT-5, CT-4.

MPLS FRR (also called MPLS local restoration or MPLS local protection) is a local restoration network resiliency mechanism. It is a feature of RSVP-TE. In FRR, each LSP passing through a facility is protected by a backup path which originates at the node immediately upstream to that facility. This node which redirects the traffic onto the preset backup path is called the PLR node 62, and the node where a backup LSP merges with the primary LSP is called MP 64. In the network 60, there is an LSR between the PLR node 62 and the MP node 64 for local rerouting. FRR provides faster recovery because the decision of recovery is strictly local. For comparison, when recovery mechanisms are employed at the Internet Protocol (IP) layer, restoration may take several seconds which is unacceptable for real-time applications (such as VoIP). In contrast, MPLS local protection meets the requirements of real-time applications with recovery times less than 50 ms.

When there is a fault between the PLR node 62 and the MP node 64 that affects any of the tunnels 66, 68, 70, the PLR node 62 selects a Facility Bypass (FB) tunnel 72 for providing protection. The current standards support various criteria for selection of the FB tunnel 72. These criteria for FB selection are signaled as part of a FAST_REROUTE object in RSVP-TE PATH messages. For example, the criteria can include setup/hold priority or bandwidth needed for the backup path.

However, the currently defined standards do not provide an option to request the PLR node 62 to select an FB tunnel which is in compliant to a specific DSTE Class Type. Due to this limitation, a DSTE capable protected tunnel such as the tunnels 66, 68, 70 cannot ensure that the backup path (or FB tunnel 72) the PLR node 62 is using for its protection is DSTE compliant.

In FIG. 4, assume there is a fault that affects all of the tunnels 66, 68, 70. The PLR node 62 selects the same FB tunnel 72 for all of the tunnels 66, 68, 70 which have different DSTE Class Types. This causes the treatment of TDM and High Priority Packet traffic in the same manner as Low Priority Packet traffic, in this example. This severely impacts the services being protected when a network fault occurs and traffic from the tunnels 66, 68, 70 shifts to the backup path, the FB tunnel 72. Note, that the underlying network for the backup path may still have dedicated bandwidth for each DSTE TRAFFIC CLASS, but since the traffic is tunneled inside the FB tunnel 72, traffic for all of the tunnels 66, 68, 72 are treated as per the class of the FB tunnel 72.

DSTE Compliant FB Tunnels

In a DSTE capable network, the operator defines various classes for its services, and, on this basis, the operator splits the network bandwidth across DSTE Class Types. As described herein, classes may be dedicated for TDM, and some may be used for various other purposes. The RSVP tunnels are also signaled with the Class Type property, and the path selected for these tunnels is compliant to the specified tunnels Class Type. For example, if a tunnel is defined of DSTE CT-7, then Interior Gateway Protocol (IGP) ensures that the path provided to this tunnel has CT-7 links. Now in FRR, since conventionally the FAST_REROUTE object does not support a DSTE capability, DSTE compliant tunnels are not ensured to have a backup path of same DSTE Class Type.

FIG. 5 is a diagram of a FAST_REROUTE object 80. The FAST_REROUTE object 80 is defined in RFC 4090. The FAST_REROUTE object is used to control the backup used for the protected LSP (tunnel). This specifies the setup and hold priorities, session attribute filters, and bandwidth to be used for protection. It also allows a specific local protection method to be requested. This object is inserted into the PATH message by the head-end LER 12 and is not changed by downstream LSRs 14. The PATH message is defined in RFC 3209 and is an LSP tunnel message which can be used for a label request, an explicit route, etc. The PATH message has associated objects including the FAST_REROUTE object 80.

The FAST_REROUTE object 80 has a Class-Num of 205 and a C-Type (Class type) of 1. The setup priority is the priority of the backup path with respect to taking resources, in the range 0 to 7. The value 0 is the highest priority. Setup Priority is used in deciding whether this session can preempt another session. The holding priority is the priority of the backup path with respect to holding resources, in the range 0 to 7. The value 0 is the highest priority. Holding Priority is used in deciding whether this session can be preempted by another session. The hop limit is the maximum number of extra hops the backup path is allowed to take, from the current node (a PLR) to an MP, with PLR and MP excluded from the count. For example, hop-limit of 0 means that only direct links between PLR and MP can be considered.

The bandwidth is a bandwidth estimate; 32-bit IEEE floating point integer, in bytes per second. The Exclude-any is a 32-bit vector representing a set of attribute filters associated with a backup path, any of which renders a link unacceptable. The Include-any is a 32-bit vector representing a set of attribute filters associated with a backup path, any of which renders a link acceptable (with respect to this test). A null set (all bits set to zero) automatically passes. The Include-all is a 32-bit vector representing a set of attribute filters associated with a backup path, all of which must be present for a link to be acceptable (with respect to this test). A null set (all bits set to zero) automatically passes.

The flags are currently defined for 0x01 One-to-One Backup Desired and 0x02 Facility Backup Desired. The present disclosure relates to 0x02 FB protection. Specifically, the present disclosure enhances the FAST_REROUTE object 80 to include the DSTE Class information in the object. The ingress LER 12 when signaling the path (in a PATH message) for a protected LSP tunnel, adds the DSTE Class Type it requires for a backup path in its FAST_REROUTE object 80.

The PLR node 62 that receives the PATH Message extracts the FAST_REROUTE object 80 and checks the DSTE Class Type support for the backup path and accordingly chooses the correct FB tunnel. The present disclosure also ensures that any PLR nodes which do not support this functionality are not impacted and process the new FAST_REROUTE object 80 as per existing implementation.

The flags are 8-bits and as described above only two flags are defined in RFC 4090 (0x01 or 0x02). The present disclosure utilizes unspecified bits in these flags to convey DSTE Class Type. In an embodiment, the present disclosure proposes the last 3 bits of the flags to be used as DSTE Class Type. The following table provides an example using the 8-bits of the flags to provide the DSTE Class Type. Note, "x" indicates don't care and is available for 0x01 or 0x02 or other flags that are later defined.

| b7 | b6 | b5 | b4 | b3 | b2 | b1 | b0 | DSTE Class Type |
|----|----|----|----|----|----|----|----|-----------------|
| 0  | 0  | 0  | x  | x  | x  | x  | x  | 0 |
| 0  | 0  | 1  | x  | x  | x  | x  | x  | 1 |
| 0  | 1  | 0  | x  | x  | x  | x  | x  | 2 |
| 0  | 1  | 1  | x  | x  | x  | x  | x  | 3 |
| 0  | 0  | 0  | x  | x  | x  | x  | x  | 4 |
| 1  | 0  | 1  | x  | x  | x  | x  | x  | 5 |
| 1  | 1  | 0  | x  | x  | x  | x  | x  | 6 |
| 1  | 1  | 1  | x  | x  | x  | x  | x  | 7 |

With this approach, the ingress LER 12 can encode the b7b6b5 bits of the flags in the FAST_REROUTE object 80 as the associated DSTE Class Type it is requesting for the backup path. The PLR node 62 which support this functionality extracts the DSTE Class Type for use is selecting the correct backup path. Non-compliant devices, which support RFC 4090 but not this additional functionality, do not read these higher bits in the flags and use the flags as defined in RFC 4090.

Figure 6:
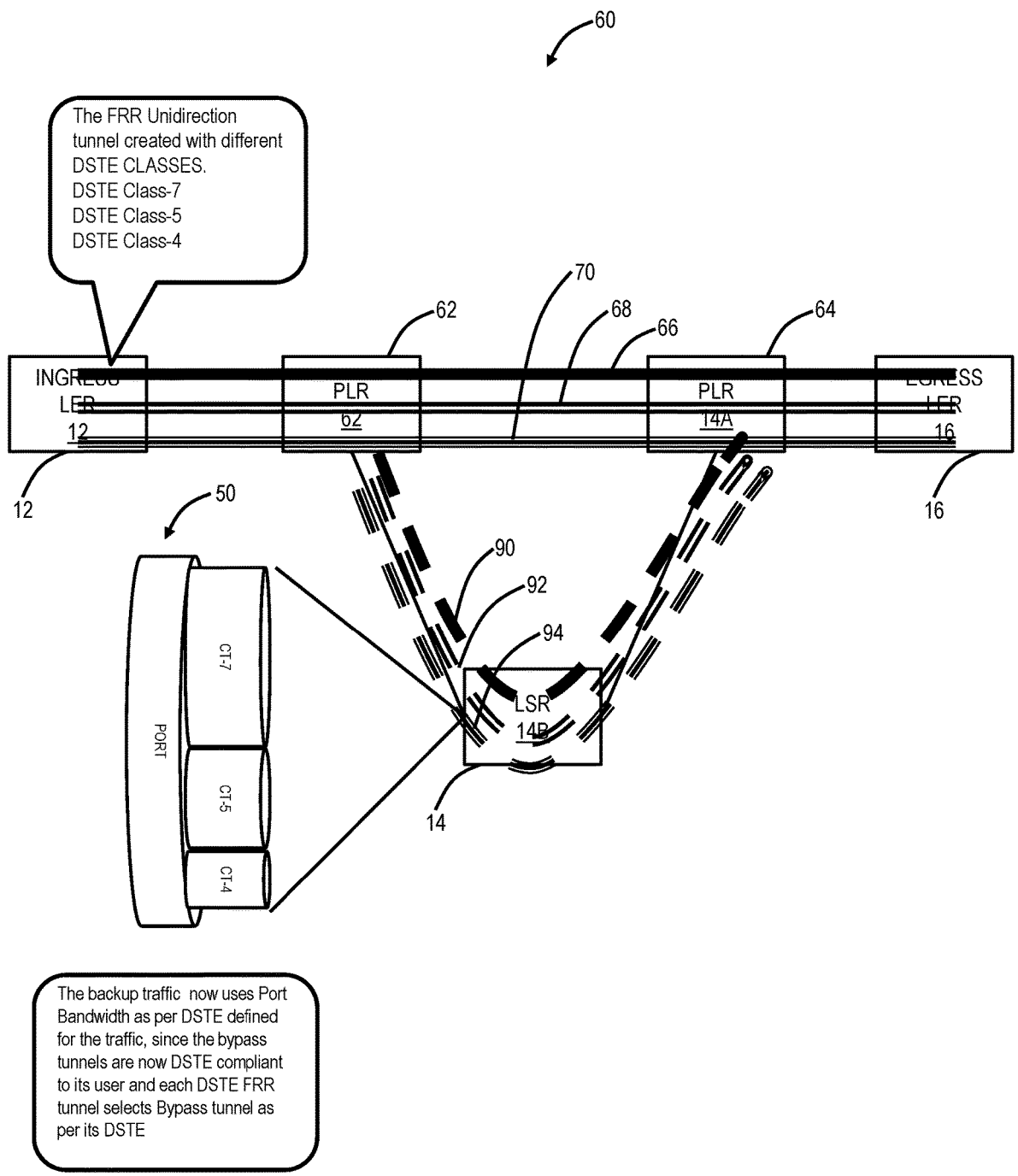
FIG. 6 is a diagram of the network of FIG. 4 illustrating FRR functionality with DSTE compliant FB tunnels.

FIG. 6 is a diagram of the network 60 illustrating FRR functionality with DSTE compliant FB tunnels. As in FIG. 4, the network 60 includes the tunnels 66, 68, 70 at the associated DSTE Class Types of CT-7, CT-5, CT-4. In this embodiment, the LER 12 is configured to signal the FAST_REROUTE object 80 in the PATH message with the associated DSTE Class Types for each of the tunnels 66, 68, 70. The PLR node 62 selects (or creates if one does not exist), a DSTE compliant FB tunnel for each protected tunnel 66, 68, 70 as per the DSTE Class Type indicated in the FAST_REROUTE object 80. In this example, the PLR node 62 would have three FB tunnels 90, 92, 94 for the respective DSTE Class Types of CT-7, CT-5, CT-4. This is in contrast to FIG. 4 which has the FB tunnel 72 which does not utilize DSTE Class Type.

Note, in the example of FIG. 6, the PLR node 62 has three FB tunnels 90, 92, 94 for the respective DSTE Class Types of CT-7, CT-5, CT-4 and the network 60 includes three tunnels 66, 68, 70 each at the respective DSTE Class Types of CT-7, CT-5, CT-4. However, those skilled in the art will appreciate that multiple tunnels of the same DSTE Class Type can share the same FB tunnel of the same DSTE Class Type. Now, since the network 60 support bandwidth as per DSTE Class Type, the TDM traffic is treated per its Class and reservation, and high and low priority packet go as per their own bandwidth reservations.

LER Process

Figure 7:
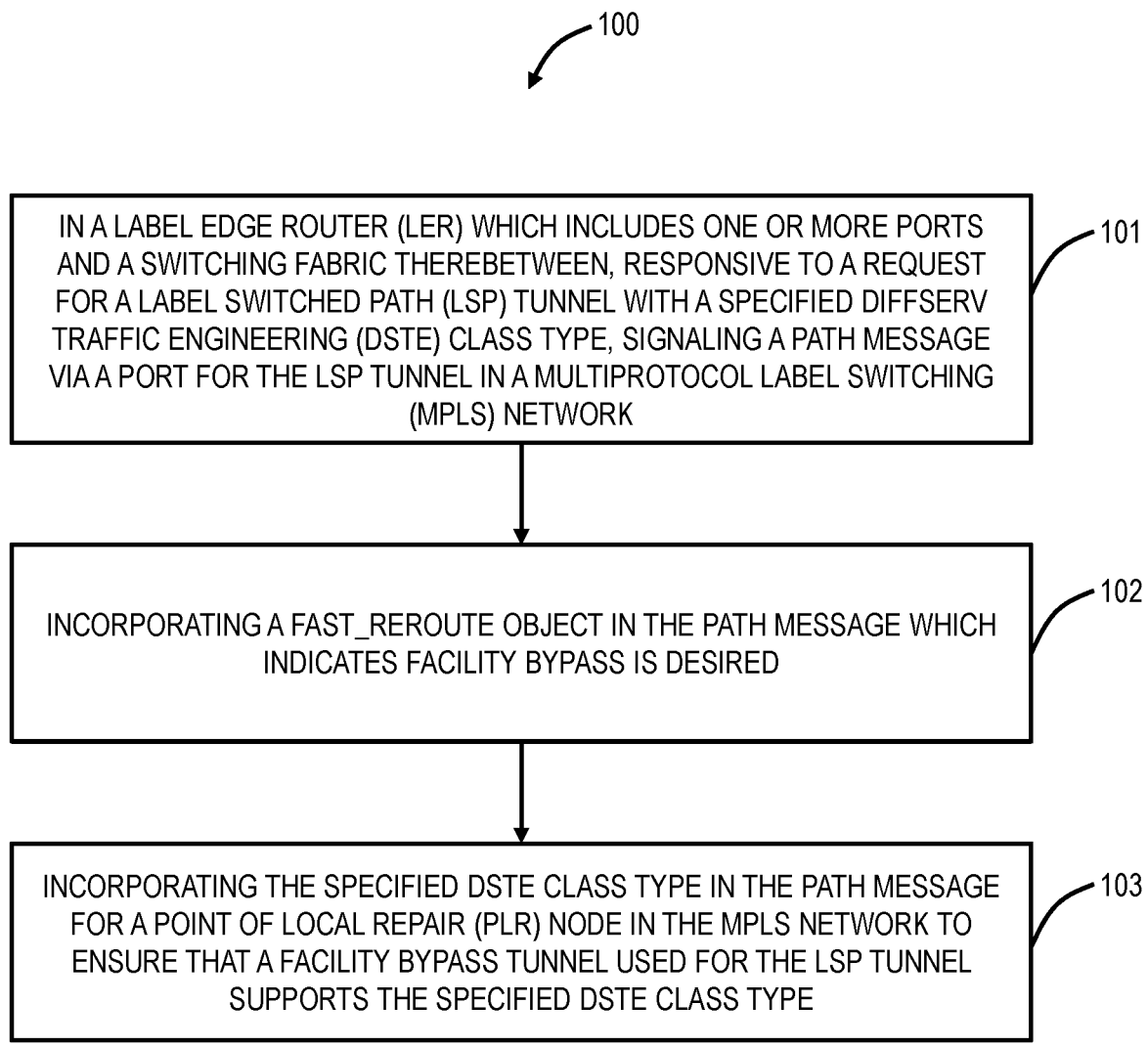
FIG. 7 is a flowchart of a process implemented in part in a Label Edge Router (LER)

FIG. 7 is a flowchart of a process 100 implemented in part in a Label Edge Router (LER). The process 100 includes, in the LER which includes one or more ports and a switching fabric therebetween, and responsive to a request for a Label Switched Path (LSP) tunnel with a specified DiffServ Traffic Engineering (DSTE) Class Type, signaling a PATH message via a port for the LSP tunnel in a Multiprotocol Label Switching (MPLS) network (step 101); incorporating a FAST_REROUTE object in the PATH message which indicates Facility Bypass is desired (step 102); and incorporating the DSTE Class Type in the PATH message for a Point of Local Repair (PLR) node in the MPLS network to ensure a Facility Bypass tunnel used for the LSP tunnel supports the specified DSTE Class Type (step 103). The DSTE Class Type can be incorporated in the FAST_REROUTE object. The DSTE Class Type can be incorporated in flags in the FAST_REROUTE object. The DSTE Class Type can be incorporated unspecified flags in the FAST_REROUTE object.

The process 100 can further include, at the PLR node, receiving the PATH message with the DSTE Class Type included therein; and, responsive to a failure of the LSP tunnel, selecting the Facility Bypass tunnel for the LSP tunnel such that the Facility Bypass tunnel supports the specified DSTE Class Type. The process 100 can further include, at the PLR node, receiving a second PATH message for a second LSP tunnel with a DSTE Class Type included therein for the specified DSTE Class Type; and, responsive to a failure of the second LSP tunnel, selecting the Facility Bypass tunnel for the LSP tunnel where the Facility Bypass tunnel is used for both the LSP tunnel and the second LSP tunnel.

The process 100 can further include, at the PLR node, receiving a second PATH message for a second LSP tunnel with a DSTE Class Type included therein for a different specified DSTE Class Type; and, responsive to a failure of the second LSP tunnel, selecting a second Facility Bypass tunnel for the second LSP tunnel such that the second Facility Bypass tunnel supports the different specified DSTE Class Type. The process 100 can further include, at the PLR node, receiving the PATH message with the DSTE Class Type included therein, wherein the PLR node is not configured to process the DSTE Class Type in the PATH message; and, responsive to a failure of the LSP tunnel, selecting the Facility Bypass tunnel for the LSP tunnel irrespective of the specified DSTE Class Type.

In another embodiment, the network element 40 includes the one or more ports 50; forwarding circuitry 52 communicatively coupled to the one or more ports; and control circuitry 54 communicatively coupled to the forwarding circuitry, wherein, responsive to a request for a Label Switched Path (LSP) tunnel to the control circuitry 54 with a specified DiffServ Traffic Engineering (DSTE) Class Type, a PATH message is signaled via a port 50 for the LSP tunnel in a Multiprotocol Label Switching (MPLS) network, wherein a FAST_REROUTE object is incorporated in the PATH message which indicates Facility Bypass is desired, and wherein the DSTE Class Type is incorporated in the PATH message for a Point of Local Repair (PLR) node in the MPLS network to ensure a Facility Bypass tunnel used for the LSP tunnel supports the specified DSTE Class Type. The DSTE Class Type can be incorporated in the FAST_REROUTE object. The DSTE Class Type can be incorporated in flags in the FAST_REROUTE object. The DSTE Class Type can be incorporated unspecified flags in the FAST_REROUTE object.

PLR Process

Figure 8:
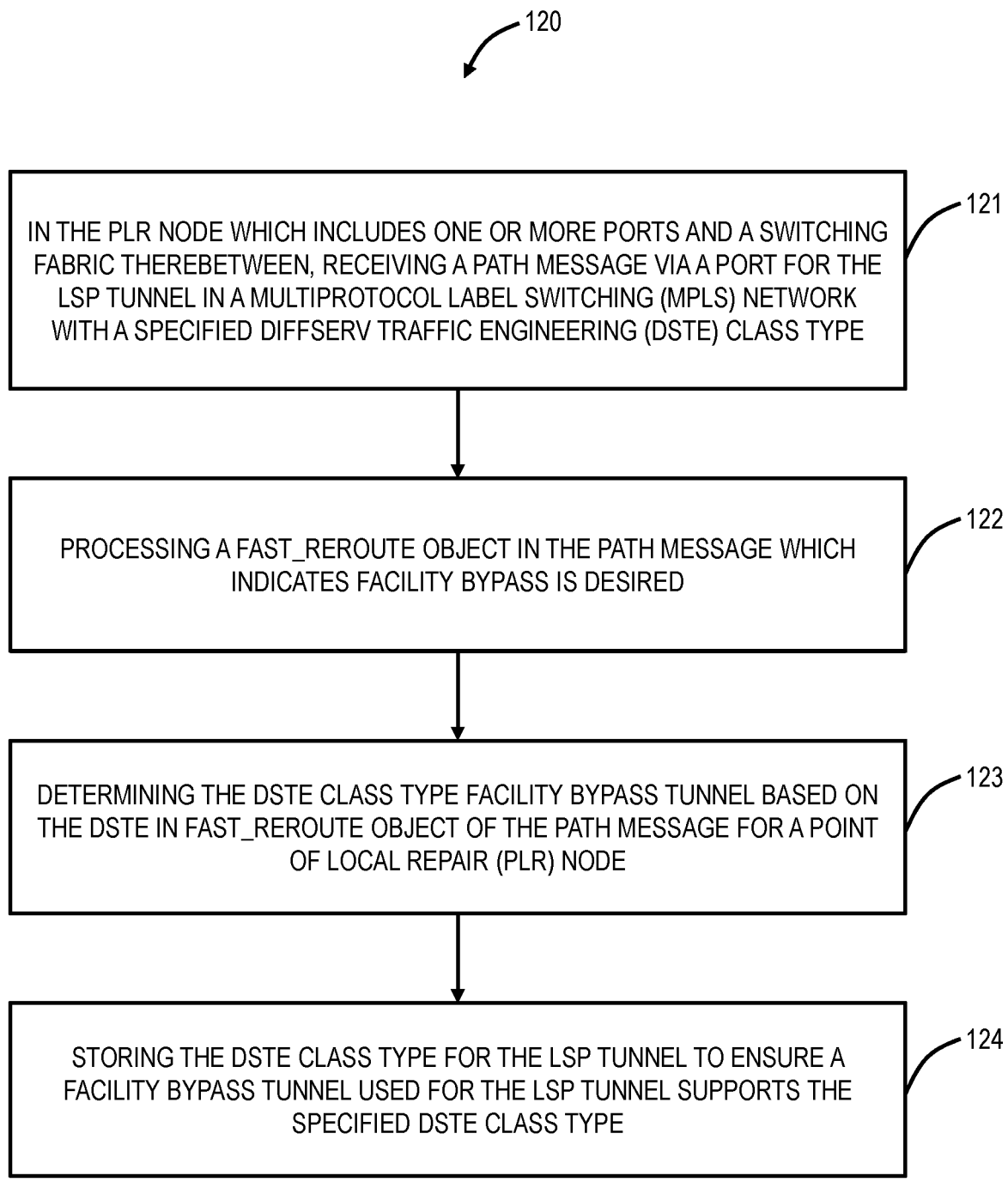
FIG. 8 is a flowchart of a process implemented in part in a Point of Local Repair (PLR) node.

FIG. 8 is a flowchart of a process 120 implemented in part in a Point of Local Repair (PLR) node. The process 120 includes, in the PLR node which includes one or more ports and a switching fabric therebetween, receiving a PATH message via a port for the LSP tunnel in a Multiprotocol Label Switching (MPLS) network with a specified DiffServ Traffic Engineering (DSTE) Class Type (step 121); processing a FAST_REROUTE object in the PATH message which indicates Facility Bypass is desired (step 122); determining the DSTE Class Type based on the PATH message for a Point of Local Repair (PLR) node (step 123); and storing the DSTE Class Type for the LSP tunnel to ensure a Facility Bypass tunnel used for the LSP tunnel supports the specified DSTE Class Type (step 124). The DSTE Class Type can be incorporated in the FAST_REROUTE object. The DSTE Class Type can be incorporated in flags in the FAST_REROUTE object. The DSTE Class Type can be incorporated unspecified flags in the FAST_REROUTE object.

The process 120 can further include, at the PLR node, responsive to a failure of the LSP tunnel, selecting the Facility Bypass tunnel for the LSP tunnel such that the Facility Bypass tunnel supports the specified DSTE Class Type. The process 120 can further include, at the PLR node, receiving a second PATH message for a second LSP tunnel with a DSTE Class Type included therein for the specified DSTE Class Type; and responsive to a failure of the second LSP tunnel, selecting the Facility Bypass tunnel for the LSP tunnel where the Facility Bypass tunnel is used for both the LSP tunnel and the second LSP tunnel.

The process 120 can further include, at the PLR node, receiving a second PATH message for a second LSP tunnel with a DSTE Class Type included therein for a different specified DSTE Class Type; and, responsive to a failure of the second LSP tunnel, selecting a second Facility Bypass tunnel for the second LSP tunnel such that the second Facility Bypass tunnel supports the different specified DSTE Class Type. The process 120 can further include, at the PLR node, responsive to a failure of the LSP tunnel, selecting the Facility Bypass tunnel for the LSP tunnel irrespective of the specified DSTE Class Type.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Point of Local Repair (PLR) network element comprising:
   one or more ports;
   forwarding circuitry communicatively coupled to the one or more ports; and
   control circuitry communicatively coupled to the forwarding circuitry,
   wherein the control circuitry is configured to
      responsive to reception of a PATH message via a port for a Label Switched Path (LSP) tunnel in a Multiprotocol Label Switching (MPLS) network with a specified DiffServ Traffic Engineering (DSTE) Class Type, process a FAST_REROUTE object in the PATH message which indicates Facility Bypass is desired,
      determine the DSTE Class Type based on the PATH message,
      store the DSTE Class Type for the LSP tunnel to ensure a Facility Bypass tunnel used for the LSP tunnel supports the specified DSTE Class Type, responsive to a failure of the LSP tunnel, select the Facility Bypass tunnel for the LSP tunnel such that the Facility Bypass tunnel supports the specified DSTE Class Type, receive a second PATH message for a second LSP tunnel with a second FAST_REROUTE object including a second DSTE Class Type that is the same as the specified DSTE Class Type, and responsive to a failure of the second LSP tunnel, select the Facility Bypass tunnel for both the LSP tunnel and the second LSP tunnel.

2. The PLR network element of claim 1, wherein the DSTE Class Type is incorporated in the FAST_REROUTE object.

3. The PLR network element of claim 2, wherein the DSTE Class Type is incorporated in flags in the FAST_REROUTE object.

4. The PLR network element of claim 3, wherein the DSTE Class Type is incorporated in unspecified flags in the FAST_REROUTE object.

5. The PLR network element of claim 1, wherein the control circuitry is further configured to responsive to a failure of the LSP tunnel, select the Facility Bypass tunnel for the LSP tunnel irrespective of the specified DSTE Class Type.

6. A Point of Local Repair (PLR) network element comprising:

one or more ports;

forwarding circuitry communicatively coupled to the one or more ports; and control circuitry communicatively coupled to the forwarding circuitry, wherein the control circuitry is configured to responsive to reception of a PATH message via a port for a Label Switched Path (LSP) tunnel in a Multiprotocol Label Switching (MPLS) network with a specified DiffServ Traffic Engineering (DSTE) Class Type, process a FAST_REROUTE object in the PATH message which indicates Facility Bypass is desired, determine the DSTE Class Type based on the PATH message, store the DSTE Class Type for the LSP tunnel to ensure a Facility Bypass tunnel used for the LSP tunnel supports the specified DSTE Class Type, responsive to a failure of the LSP tunnel, select the Facility Bypass tunnel for the LSP tunnel such that the Facility Bypass tunnel supports the specified DSTE Class Type, receive a second PATH message for a second LSP tunnel with a second FAST_REROUTE object including a second DSTE Class Type therein for a different DSTE Class Type than the specified DSTE Class Type, and responsive to a failure of the second LSP tunnel, select a second Facility Bypass tunnel for the second LSP tunnel such that the second Facility Bypass tunnel supports the different specified DSTE Class Type.

7. The PLR network element of claim 1, wherein the DSTE Class Type is incorporated in the FAST_REROUTE object.

8. The PLR network element of claim 2, wherein the DSTE Class Type is incorporated in flags in the FAST_REROUTE object.

9. The PLR network element of claim 3, wherein the DSTE Class Type is incorporated in unspecified flags in the FAST_REROUTE object.

10. The PLR network element of claim 1, wherein the control circuitry is further configured to responsive to a failure of the LSP tunnel, select the Facility Bypass tunnel for the LSP tunnel irrespective of the specified DSTE Class Type.

11. A method comprising:

in a Point of Local Repair (PLR) network element which includes one or more ports and forwarding circuitry communicatively coupled to the one or more ports, responsive to reception of a PATH message via a port for a Label Switched Path (LSP) tunnel in a Multiprotocol Label Switching (MPLS) network with a specified DiffServ Traffic Engineering (DSTE) Class Type, processing a FAST_REROUTE object in the PATH message which indicates Facility Bypass is desired;

determining the DSTE Class Type based on the PATH message;

storing the DSTE Class Type for the LSP tunnel to ensure a Facility Bypass tunnel used for the LSP tunnel supports the specified DSTE Class Type;

responsive to a failure of the LSP tunnel, selecting the Facility Bypass tunnel for the LSP tunnel such that the Facility Bypass tunnel supports the specified DSTE Class Type;

receiving a second PATH message for a second LSP tunnel with a second FAST_REROUTE object including a second DSTE Class Type that is the same as the specified DSTE Class Type; and responsive to a failure of the second LSP tunnel, selecting the Facility Bypass tunnel for both the LSP tunnel and the second LSP tunnel.

12. The method of claim 11, wherein the DSTE Class Type is incorporated in the FAST_REROUTE object.

13. The method of claim 12, wherein the DSTE Class Type is incorporated in flags in the FAST_REROUTE object.

14. The method of claim 13, wherein the DSTE Class Type is incorporated in unspecified flags in the FAST_REROUTE object.

15. The method of claim 11, the method further comprising responsive to a failure of the LSP tunnel, selecting the Facility Bypass tunnel for the LSP tunnel irrespective of the specified DSTE Class Type.

* * * * *